United States Patent
Alt et al.

(10) Patent No.: US 7,521,080 B2
(45) Date of Patent: Apr. 21, 2009

(54) PROCESS FOR THE GRANULATION OF AN ANIMAL FEEDSTUFF ADDITIVE

(75) Inventors: Hans Christian Alt, Gelnhausen-Meerholz (DE); Stefan Stockhammer, Nidderau (DE); Matthias Moll, Banska Bystrica (DE); Joachim Pohlisch, Gelnhausen (DE); Claas-Jürgen Klasen, Freigericht (DE)

(73) Assignee: Evonik Degussa GmbH, Essen (DE)

(*) Notice: Subject to any disclaimer, the term of this patent is extended or adjusted under 35 U.S.C. 154(b) by 591 days.

(21) Appl. No.: 10/887,303

(22) Filed: Jul. 9, 2004

(65) Prior Publication Data

US 2005/0025878 A1  Feb. 3, 2005

(30) Foreign Application Priority Data

Jul. 11, 2003 (DE) .............................. 103 31 366

(51) Int. Cl.
*A23L 1/0562* (2006.01)

(52) U.S. Cl. .......................... 426/656; 426/61; 426/72; 426/73; 426/453; 426/464; 426/467; 426/471; 426/473; 426/807

(58) Field of Classification Search ............... 426/61, 426/72, 73, 656, 471, 473, 453, 464, 467, 426/807

See application file for complete search history.

(56) References Cited

U.S. PATENT DOCUMENTS

| 4,181,710 | A | 1/1980 | Dannelly et al. |
|---|---|---|---|
| 4,777,051 | A | 10/1988 | Nagano et al. |
| 4,946,654 | A | 8/1990 | Uhlemann et al. |
| 5,840,358 | A | 11/1998 | Hofler et al. |
| 6,238,714 | B1 | 5/2001 | Binder et al. |
| 6,337,084 | B1 | 1/2002 | Stevens et al. |
| 2003/0018075 | A1 | 1/2003 | Kawamata et al. |
| 2003/0037415 | A1* | 2/2003 | Alt et al. .................. 23/293 R |
| 2004/0115304 | A1 | 6/2004 | Dubner et al. |

FOREIGN PATENT DOCUMENTS

| EP | 0 407 325 | 1/1991 |
|---|---|---|
| EP | 0533039 A1 | 3/1993 |
| EP | 0615693 A2 | 9/1994 |

OTHER PUBLICATIONS

European Search Report issued in EP 07111607 dated Dec. 21, 2007.

* cited by examiner

*Primary Examiner*—Helen F Pratt
(74) *Attorney, Agent, or Firm*—Pillsbury Winthrop Shaw Pittman LLP

(57) ABSTRACT

The invention relates to a process for the granulation of an animal feedstuffs additive comprising amino acids or vitamins in a circulating fluidized bed, wherein the additive is preferably a fermentation product and optionally comprises further constituents from the fermentation broth.

17 Claims, No Drawings

PROCESS FOR THE GRANULATION OF AN ANIMAL FEEDSTUFF ADDITIVE

Priority is claimed to German Patent Application No. 10331366.4 filed Jul. 11, 2003.

FIELD OF THE INVENTION

The invention relates to a process for the granulation of an animal feedstuff additive comprising amino acids or vitamins in a circulating fluidized bed, wherein the additive is preferably a fermentation product and optionally comprises further constituents from the fermentation broth.

BACKGROUND OF THE INVENTION

Animal feedstuffs are supplemented with individual amino acids according to the requirement of the animals. For supplementing animal feedstuffs, e.g. with L-lysine, L-lysine monohydrochloride having an L-lysine content of 78% is predominantly employed to date. Since L-lysine is prepared by fermentation, for the preparation of the monohydrochloride it must once initially be separated off from all the other constituents of the crude fermentation broth in expensive process steps and then converted into the monohydrochloride, and the latter must be crystallized. A large number of by-products and the reagents needed for the working up are produced as waste by this procedure. Since a high purity of the animal feedstuff supplement is not always necessary and furthermore the by-products of the fermentation often still comprise nutritionally active valuable substances, there has therefore been no lack of attempts in the past to convert L-lysine together with constituents of the fermentation broth into a solid animal feedstuff less expensively.

The complex composition of such media has proved to be a serious disadvantage in the processing. These generally can be dried only with difficulty, and the dried products are often hygroscopic, practically not free-flowing, at risk from the formation of lumps and unsuitable for the industrially demanding processing in mixed feedstuff plants. The products from the fermentation for the preparation of lysine are to be mentioned above all here. Simple dewatering of the crude fermentation broth by spray drying leads to a dusty, highly hygroscopic concentrate which is lumpy after a short storage time and cannot be employed as an animal feedstuff in this form.

The use of a spray dryer with an integrated fluidized bed gives finely divided and porous but free-flowing spray particles with a very low bulk density and a still high hygroscopic nature. A considerable dust nuisance arises in the handling of this product.

Build-up granulation in a fluidized bed has also proved to be not very suitable, since here also large amounts of additional substances (as a rule more than 10 wt.%) are necessary, these being added continuously according to DD 268 856. The use thereof in this context is essential in particular in order to bind the water from the fermentation broth and in this way to prevent the granules from forming lumps, which would have an adverse effect in the case of build-up granulation in particular.

Further processes for the granulation of animal feedstuff additives comprising amino acids and based on fermentation broth are known from U.S. Pat. No. 4,777,051, EP 0 615 693 B and EP 0 533 039 B.

U.S. Pat. No. 4,777,051 discloses a spray drying process with a subsequent additional drying step. Solutions of tryptophan or threonine of varying origin having a content of 20-60 wt. %, based on the total solids content, are sprayed in a first step to give semi-dry granules having a residual moisture content of 5-15%. The moist granules are then spread out on a conveyor belt dryer with a perforated base and finally dried with hot air, a product having a residual moisture content of about 4 wt. % being obtained.

Drying is accordingly carried out in an expensive manner in two stages in two different apparatuses.

According to EP 0 615 693, the granulation is also carried out in a two-stage drying process.

The fermentation broth is spray dried, optionally after removal of some of the constituents, to give fine particles which have a maximum particle size of 100 μm to the extent of min. 70 wt. %, and the fine particles obtained in this way are built up in a second stage to give granules which comprises fine particles to the extent of min. 30 wt. %.

In addition to the two-stage nature of the drying granulation process, the disadvantage of this process is that the granulation can be carried out only batchwise and not continuously.

EP 0 809 940 B1 also discloses a process for the granulation of an animal feedstuff additive based on fermentation broth. The process is characterized in that the fermentation broth is granulated, compacted and dried in a fluidized bed in one step, while an amount of energy sufficient to establish a desired particle diameter and a desired bulk density is introduced into the fluidized bed by a mechanical route, in addition to the energy required for generation of the stationary fluidized bed.

An essential feature of fluidized bed spray granulation is the formation of a stable fluidized bed within the granulator. This means that the speed of the inflow medium must be chosen such that fluidization of the particles to be dried occurs, but pneumatic conveying is avoided. It is thus ensured that the particles formed indeed are not discharged, but a constant change in place of the particles takes place, so that there is a uniform probability of impingement for the drops sprayed in.

This process has the known disadvantages of fluidized bed spray granulation. These are chiefly:

As the particle size decreases, the speed of the inflow medium must be greatly reduced, so that a stable stationary fluidized bed is maintained and discharge of the particles from the granulator is avoided. Since in this process the inflow medium is the energy carrier, the efficiency decreases to an extreme degree. The build-up rates which can be achieved are too low for the granulation process still to be able to be operated economically.

A process of this type is described in U.S. Pat. No. 4,946, 654. A loss of material due to the discharge of dust is avoided by separating this off from the gas flowing out of the granulator and recycling it into the fluidized bed.

The lines have dimensions such that only small amounts of solid can be fed back.

SUMMARY OF THE INVENTION

The object of the invention is to provide an efficient process for the granulation of an animal feedstuffs additive comprising amino acids and vitamins which can be carried out continuously, the additive preferably being a fermentation product and optionally comprising further constituents.incl. the biomass from the fermentation broth.

DETAILED DESCRIPTION OF THE INVENTION

The invention relates to a process for the granulation of L-amino acids and vitamins, in particular chosen from the group consisting of methionine, L-lysine, L-threonine, L-arginine, L-tryptophan or calcium pantothenate or pantothenic acid (vitamin B5), which is characterized in that the granulation is carried out in a circulating fluidized bed, by a procedure in which
a) an aqueous suspension or an aqueous solution of an amino acid or a vitamin is sprayed in a granulator chamber containing the fluidized bed,
b) at least 10 wt. % of the particles in the granulator chamber are discharged with the drying gas,
c) the particles discharged are then separated off from the gas stream,
d) the particles separated off from the waste gas stream are fed back to the chamber and
e) granulated particles having a size within the desired particle size range are taken off continuously from the chamber, preferably downwards, so that the amount of solid in the chamber remains constant.

Advantageously, the drying gas flows through the chamber against the force of gravity and is passed into the chamber via an inflow base with a temperature in the range from 100 to 450° C., preferably 150 to 350° C.

In contrast to the prior art, according to the invention granulation is carried out in this manner not in a stationary fluidized bed but in a circulating fluidized bed (CFB). This means that the inflow speed of the drying gas stream is adjusted such that 10 to 100 wt. %, preferably 30 to 100 wt. %, in particular 50 to 100 wt. % of the solid particles, based on the fluidized bed in the granulator chamber, leave this chamber upwards continuously and are then separated off from the gas stream and recycled into the granulator chamber.

The inflow speed necessary for the discharge depends on the particle size and the density of the particles and is in general 1 to 10 times, preferably 1 to 4 times the speed necessary also to allow particles which do not belong to fine dust (<100 μm) to circulate with the drying gas stream in the desired amount. These are in particular particles which have not yet reached the desired final size.

In the conventional fluidized bed processes (e.g. U.S. Pat. No. 4,946,654) only very small amounts of fine dust are blown out and the particles having a particle size distribution in the region of >100 μm remain in the fluidized bed and are taken off from this, but not circulated.

According to the invention, particles having particle sizes of < and >100 μm, if desired also in the range from 250 μm to 600 μm, are conveyed upwards in the desired amount and circulated.

According to the invention, the circulation rate per hour in general corresponds to 2 to 100 times, in particular 5 to 50 times the mass hold-up in the granulator chamber. According to the prior art, in contrast the value for this parameter in the fluidized bed is <2. The upper limit of the inflow speed is determined by the given parameters of ease of operation of the apparatus.

It has also been found that by the additional introduction of mechanical energy into the fluidized bed, a less intensive granule growth or an evening out of the particle diameters and an increase in the bulk density are achieved.

The granulation process is particularly advantageously carried out such that the additional energy is introduced into the fluidized bed in the granulation chamber by movable flat structures. These can be rotating knives, vanes, blade surfaces, flat iron bars or compacters installed in the chamber of the fluidized bed. It is possible here for the knives, blades, flat iron bars, compacters or the like to be driven mechanically and in this way to achieve a constant comminution of the granulation particles, so that the particles of the fluidized bed remain below a certain particle size. However, all other tools familiar to the expert which, for example, can be immersed directly in the fluidized bed are also possible. The use of rotating screws or mixing tools with high shearing forces is thus conceivable, these tools also acting on the particles or granules in the fluidized bed and interacting with the particles.

The CFB process is known above all from heterogeneous catalysis using finely divided catalysts or combustion technology, but not for the formation of granules of organic compounds.

The solids to be granulated are animal feedstuffs additives, preferably amino acids and vitamins. In the case of amino acids, preferably L-arginine, methionine, L-lysine, L-threonine and L-tryptophan, and in the case of vitamins, preferably calcium pantothenate (vitamin B5) or pantothenic acid.

Concentrated aqueous solutions or suspensions of the purified compounds from chemical and fermentative production having a purity of the solid of 80 to approx. 99.5%, as well as concentrated fermentation broths are employed here. As described in EP 0 809 940 B1 and EP 615 693 B1 in particular for L-lysine, in addition to these compounds the fermentation broths optionally also contain further constituents of the fermentation broth, as well as the biomass. However, the biomass can also have already been completely or partly separated off.

It has been found that in contrast to known processes of stationary fluidized bed spray granulation, with the solids mentioned high build-up rates and therefore an efficient process can also be realized for particles having a relatively low average diameter of e.g. 100 to 400 μm with the process according to the invention. Even particles in the size range below 100 μm are accessible via a fluidized bed spray granulation.

The efficiency of the process also depends on the solids content in the solution introduced. As the solids content increases, the amount of water to be evaporated drops. The energy requirement necessary for the granulation is reduced and the apparatus can be smaller in construction. For relatively poorly soluble solids, such as e.g. L-threonine (solubility at 85° C. approx. 19%), the solubility and therefore the efficiency of the process has been found in superheating of the medium introduced. Using a special nozzle arrangement, a pre-pressure of 1 up to 5 bar is generated in the feed line to the nozzles, rendering heating to above 100 to 160° C. possible. The special two-component pressure nozzle operated with compressed air has an extended liquid insert with a triple-groove whirling body. The whirling body has dimensions and is adjusted such that the free cross-section which the liquid must pass is as large as possible and nevertheless a high drop in pressure of up to 5 bar is achieved in the liquid zone under operating conditions. At the same time, in spite of this build-up, solid particles contained in the fluid having a particle size of up to 50 μm can pass through the nozzle. The atomization of the liquid passing through the whirling body takes place pneumatically by expansion of compressed air in the annular gap around the liquid insert.

The solubility of L-threonine increases to approx. 32% at 120° C. Surprisingly, even in the case of heat-sensitive amino acids and vitamins, decomposition reactions and therefore product losses have not been found at all here during the progress of the granulation.

The increase in the solids concentration can also take place by the use of suspensions of the corresponding solid in a saturated solution of the corresponding solid. This can be produced by super-concentration of a solution containing the solid by evaporation etc.

addition of the solid to a saturated solution of the solid.

If suspensions are employed, a small particle size (in general 10-30 μm) of the undissolved solids content offers advantages in the production of stable granules. If necessary, the particle size of the undissolved content can be reduced accordingly by prior dry grinding of the solids content added wet grinding in the suspension, preferably by only one pass through the grinding organ in the feed line to the spray nozzle.

With the process described it is possible to process suspensions having solids concentrations of up to more than 70 wt. %.

Suspensions having a content of 25 to 60 wt. %, based on the total amount of the suspension, are preferably employed.

Surprisingly, it has been possible also to produce granules with the required properties from solutions or suspensions of very pure solids (up to 99.5%) without the addition of binders or other auxiliary substances using the process described.

The invention also provides a device for carrying out the process according to the invention, which has the following features:
a) a cylindrical or rectangular granulator chamber having a diameter/height ratio of 1:1 to 1:5 (in the case of the rectangular construction the dimensions are width:length:height of 1:1:1 to 1:8:5), which contains an inflow base,
b) an atomizer organ for the suspension or solution arranged in this chamber,
c) feed organ for the fluidizing or drying medium
d) a discharge opening for the product to be recycled arranged in the upper part of the chamber,
e) a solids separating system which is connected to the chamber via this discharge opening, and which contains a waste air pipe, optionally provided with a filter unit, for removal of the gas stream,
f) a return feed for the product to be recycled, which, starting from the discharge opening, opens in the lower part of the chamber,
g) optionally a sifter which is installed at the lower part of the chamber.

The device comprises a preferably tall granulation chamber 1 having a width to length to height ratio of 1:1:1 to 1:8:5, preferably 1:6:3. It is provided with a suitable inflow base at the lower end. The pressure loss of the base must be such that the inflow medium is distributed uniformly over the complete apparatus cross-section and no dead zones are present. After a further rectangular or cylindrical part, which can also be of extended construction expanding to twice the width or diameter, the waste gas feed of the granulator opens into the separator system, for example via one or more separating cyclones connected in series and a waste air filter into the circulating gas line or the waste gas chimney. The solids separators are provided with solids return lines into the granulation chamber just above the inflow base. Suitable apparatuses, such as, for example, bucket wheel sluices, are employed for pneumatic closure of the solids separators. The granulation chamber is supplied with hot drying gas (for example flue gas, air, nitrogen) via a fan and a suitable gas heater.

A sifting discharge pipe, which can have diverse shapes, is preferably installed centrally at the lower end of the granulation chamber and opens in a recess of the inflow base. It can be provided with baffles to intensify the sifting performance, or connected to a sifting chamber. A defined sifting upwards flow can be established in the sifter pipe via a gas supply independent of the main stream. The solid can be discharged against this flow via a further pneumatic closure.

In order to produce approximately spherical particles, it is advantageous to divide the suspension or solution into very fine droplets. Pneumatic nozzles and pressure nozzles can be employed for atomization of the suspension or solution. A combined two-component pressure nozzle is preferably employed, the suspension being conveyed to the nozzle via a multi-stage low-pulsation high pressure pump. A three-component nozzle or multi-component nozzle can also be employed. The pressure insert of this nozzle should be such that a high drop in pressure is achieved with the flow rates under operating conditions. In order to obtain a very fine spray, the pressure atomization is also overlapped here by an additional two-component atomization by means of compressed air.

The nozzle preferably sits at the bottom above the inflow base centrally in the middle of the granulation chamber over the sifter opening with the spray direction upwards. The nozzle stream and therefore the opening angle can be adjusted with an adjustable air cap.

The granulation of solids in the circulating fluidized bed (CFB) is carried out in the manner described in the following. It is essential that the inflow speed of the hot drying gas in the granulation chamber is preferably significantly higher than the discharge speed of granulating particles.

A solids-containing suspension or solution is sprayed with the nozzle into the granulation chamber, which is operated with hot drying gas and is either still free from solids or already provided with an initial filling of fine particles. The liquid evaporates there and solids remain. The particle stream forming in the granulation chamber is discharged from this chamber in an amount of up to 100% and then separated off, for example with the aid of cyclones, and recycled into the chamber. This is preferably effected with a very high circulation rate. Preferred circulation rates are 2 to 100 times, particularly preferably 5 to 50 times the mass hold-up in the granulator per hour.

In order to have enough spray nuclei to take up the suspension droplets in this circulating mass, it is necessary to maintain an adequate mass hold-up in the system, which is accompanied by a high circulating mass stream. The design of the solids separation of the waste gas stream is to be adapted to this high throughput.

A measurement of the pressure loss, for example over the first cycle, can be employed as the measurement parameter for the circulating mass stream. At a higher solids loading, the pressure drop over the cyclone increases under otherwise identical operating conditions. If the cyclone is overloaded and breaks down, the pressure difference reaches a maximum value which does not rise further. The operating point to be aimed for is somewhat below this level.

In the upwards flow of the drying chamber, the recycled solid is conveyed upwards past the nozzle. Solid particles and spray droplets impinge in the nozzle stream. The liquid dries off on the surface of the particles, and the solid contained therein remains. As a result, the particles grow in the circulation layer. To achieve granules which are as spherical as possible, the spray drops must be considerably smaller than the circulated granules.

The circulating mass must be kept constant, so that after a sufficient mass hold-up has been built up in the granulator, some of the mass therein must be discharged continuously. By decreasing the gas flow of the integrated sifter, only the coarse particles are discharged and the fine material remains in the granulator for further building up of granules. The sifter is regulated such that the mass circulating in the system remains constant.

The particle size to be achieved in the discharge depends on the nucleus balance in the granulator. This is essentially determined by the equilibrium of nucleus formation by abrasion or non-impinging spray drops and the build up of granules. The particle size can be increased in a controlled manner on the one hand by the choice of drying parameters or on the other hand by addition of binders.

Other drying parameters can thus be established by increasing the amount of feed. As a result, the waste air temperature drops and more spray droplets are produced, which dry more slowly. The probability of impingement on the granule nuclei therefore increases, and in addition the granule surface remains moist for longer. On average larger nuclei are formed.

The addition of binders increases the firmness of the granules, as a result of which the abrasion is decreased. Fewer nuclei are thus formed. The average particle size of the granules increases in turn.

The process according to the invention can be supplemented by a product drying integrated into the process.

The object of the invention is to develop a process for the preparation of approximately spherical, massive particles having a narrow particle size distribution in the particle size range from 100 µm to 2,000 µm and good pouring properties (low abrasion, low dust content, good flow properties) from a solids suspension or a solution.

Preferably, the process is operated for the preparation of feedstuffs additives such that the average particle size of the animal feedstuffs additive is established at values of between >0.1 and 2.0 mm. The diameter of 95% of the particles is preferably in the range between >0.1 and 1.2 mm. It is moreover particularly expedient if the diameter of the particles is established such that it is in the range between 0.3 and 0.8 mm in 95% of the particles. In a still further preferred variant of the process according to the invention, it is preferable for it to be in the range between 0.5 and 1.2 mm in 95% of the particles.

A product having a desired bulk density is obtained with the process according to the invention in one step from fermentation broth which is preferably thickened and can be partly or completely freed from the biomass or in the original state. The bulk density of the animal feedstuffs additive here is preferably established at >600 kg/m$^3$ to 700 kg/m$^3$. In a still further expedient modification of the process, the invention can be carried out by a procedure in which the bulk density of the animal feedstuffs additive is established at >650 kg/m$^3$ to 800 kg/m$^3$ in a single step.

In addition, animal feedstuffs additives with an outstanding abrasion resistance of the granules can be obtained by the process according to the invention. It is thus easily possible, with a suitable process procedure, to establish the abrasion resistance of the animal feedstuffs additive at abrasion values in the region of <1.0 wt. %. The process of the invention is particularly preferably carried out such that the abrasion resistance of the animal feedstuffs additive is established at an abrasion of between 0 and 0.3 wt. %.

The dry additives accessible according to the invention conventionally comprise up to 20% of fermentation biomass.

Relatively high amino acid contents of up to max. 90% in the dry mass can be achieved e.g. in the preparation of L-threonine with *Escherichia coli*.

In the preparation of L-lysine, L-arginine or L-tryptophan with *Corynebacterium glutamicum* or *Escherichia coli* K12 derivatives, the amino acid content is as a rule somewhat lower, and in particular in the case of tryptophan, by fermentation maximum contents of 70 wt. % are currently typical.

Preferably, only one component, in particular an amino acid, is predominantly present as the active compound in the additive obtainable according to the invention. Such an additive can then be metered universally into any feed or into premixes according to is active compound content. In the case of defined feed mixtures, however, it may also be expedient for several components, in particular amino acids, to be present in the additive in a particular ratio to one another, so that the desired enrichment is achieved with only one additive. The ratio of these active compounds can be obtained, for example, by mixing several fermentation broths or additives and also by metering in the pure active compounds of L-amino acids or vitamins. In addition to an individual active compound or several active compounds, which are contained in a targeted manner or are defined, in the additive, as few as possible further active compounds which are undefined or not suitable for supplementing should be present in the additive.

To increase the amino acid content in the dry mass or to standardize the dry mass to a particular content of amino acid or to lower the protein content of the dry mass, the biomass and optionally other substances can be removed, preferably after the end of the fermentation, by mechanical separation techniques, the predominant contents of the remaining components of the fermentation broth being left.

If no biomass is to be separated off, the fermentation is advantageously to be carried out such that as little biomass as possible is produced, in which case the nutrients added should have been consumed as far as possible at the end. Such a fermentation is described e.g. in DE-A 41 30 867, example 3. The fermentation is advantageously carried out such that over at least 30%, preferably over at least 70% of the duration of the fermentation the concentration of utilizable sugars in the fermentation broth is not more than 0.3 wt. %.

The granulated feedstuffs additives comprise L-amino acids or vitamins in an amount of 40 to ~100 wt. %, preferably 40 to 85 wt. %.

Mutants of the species *Corynebacterium* or *Brevibacterium* which are preferably suitable for lysine are used as microorganisms which produce amino acid.

Hydrolysates of manioc starch (cassava), high fructose corn syrup (HFCS), starch hydrolysates (glucose) or sucrose are preferably employed as the source of carbon. A small content can also originate from sugar beet or sugar cane molasses. This content should not exceed 5 wt. % of the total source of carbon (=10 wt. % of molasses in the total source of carbon).

For threonine, tryptophan or pantothenic acid, suitable mutants of the species *Escherichia coli* or *Corynebacterium* or Corynebacteria are preferably employed.

In addition to ammonia or ammonium sulfate, hydrolysates of protein-containing substances, such as maize gluten, soya flour or the biomass from a previous batch or, for example, corn steep liquor or fish peptone, serve as the source of nitrogen.

The fermentation temperature is expediently between 30 and 40° C. and the pH of the fermentation medium is between 6.0 and 8.0. The duration of the fermentation is in general 100 h and more.

After the end of the fermentation, in general the microorganisms are killed by means of heat or also by other methods, e.g. by addition of a mineral acid, such as sulfuric acid.

The biomass is then optionally completely or partly separated off by known processes, such as separation, decanting, a combination of separating and decanting, ultrafiltration or microfiltration.

The fermentation broth is then thickened by known processes, e.g. in a thin film or falling film evaporator, to give a pre-concentrate having a solids content of 30 to 60 wt. %. This pre-concentrate, like the fermentation broth, can then be subjected directly to the process according to the invention.

If standardization of the animal feedstuffs additive according to the invention in respect of the content of L-amino acid is desired, this can be carried out, for example, by appropriate choice of the amount of biomass which remains and/or suitable blending of pre-concentrates and/or fermentation broths. Biomass-free or -reduced broths can also be mixed accordingly with original broths for standardization. Another possibility is the addition of small amounts of additional substances which are acceptable under feedstuffs legislation, such as wheat bran, maize spindle flour or perlites, or also addition of pure L-amino acids or vitamins.

The animal feedstuffs additives obtainable by the process of the invention are used for supplementing or preparation of an animal feedstuff or a premix for animal feedstuffs.

They optionally comprise biomass in an amount of >0 to 20 wt. % (dry mass).

Examples

| Conc. THR | Description of feed to the nozzle | Temp. of feed to the nozzle °C. | Volume flow Nm³/h | Temperature °C. | Particle size d10 µm | Particle size d50 µm | Particle size d90 µm | Bulk density g/l | Circulation rate /h | Inflow speed m/sec |
|---|---|---|---|---|---|---|---|---|---|---|
| \multicolumn{11}{c}{1) Purified solutions of L-threonine are sprayed in a circulating fluidized bed. The purity of the L-threonine was above 98.5% ($d_{10}$: 10% of the particles have the stated max. particle size).} |
| 20% | solution | 98 | 650 | 250 | 90 | 268 | 475 | 595 | 30-50 | 1.8 |
| 30% | superheated solution | 120 | 450 | 350 | 138 | 275 | 620 | 694 | 10-30 | 1.2 |
| 40% | suspension | 120 | 450 | 350 | 127 | 329 | 1000 | 576 | 10-30 | 1.2 |
| 50% | suspension | 120 | 450 | 350 | 83 | 204 | 496 | 644 | 10-30 | 1.2 |
| \multicolumn{11}{c}{2) Threonine fermentation broths freed from biomass are sprayed in a circulating fluidized bed. The purity of the L-threonine was 80%.} |
| 22.7% | solution | 95 | 650 | 210 | 120 | 395 | 730 | 650 | 20-40 | 1.8 |
| \multicolumn{11}{c}{3) Calcium pantothenate fermentation broths freed from biomass are sprayed in a circulating fluidized bed. The purity of the calcium pantothenate was 55%.} |
| 27.5% | solution | 95 | 650 | 120 | 170 | 350 | 530 | 650 | 30-50 | 1.8 |

What is claimed is:

1. A process for granulation of L-threonine from a solution comprising the steps of:
   (a) spraying a superheated aqueous suspension or an aqueous solution of L-threonine in the granulation chamber, the aqueous solution of L-threonine being superheated to a temperature ranging from 100° C. to 160° C.;
   (b) granulating L-threonine into solid particles in a circulating fluidized bed of a granulation chamber;
   (c) discharging at least 30% weight of the solid particles with a drying gas stream from the granulation chamber;
   (d) separating the discharged solid particles from the drying gas stream of step (c);
   (e) removing granulated particles within the size range of greater than 100 µm to 2,000 µm from the granulation chamber at a rate such that the amount of solid L-threonine remains constant in the granulation chamber; and
   (f) recycling the solid particles of step (d), which have not reached the desired size range of greater than 100 µm to 2,000 µm, back into the circulating fluidized bed of steps (a)-(b).

2. The process of claim 1, wherein the drying gas stream is passed into the granulation chamber through an inflow base and is allowed to flow upwards through the circulating fluidized bed against the force of gravity.

3. The process according to claim 2, wherein the drying gas stream from the inflow base flows at an inflow speed that is 1 to 10 times the speed necessary to allow the desired particle size to circulate out of the granulation chamber with the drying gas stream.

4. The process according to claim 3, wherein the inflow speed is 1 to 3 times the speed necessary to allow the desired particle size to circulate out of the granulation chamber with the drying gas stream.

5. The process of claim 1, wherein the solid particles in the granulation chamber are discharged upwards in a continuous manner with the drying gas stream.

6. The process according to claim 1, wherein the circulation rate per hour of the fluidized bed is 2 to 100 times the mass remaining in the granulation chamber.

7. The process according to claim 1, wherein the drying gas stream flows through an inflow base into the granulation chamber at a temperature ranging from 100 to 450° C.

8. The process according to claim 1, wherein an aqueous solution of L-threonine is sprayed into the granulation chamber using pneumatic nozzles or pressure nozzles.

9. The process according to claim 8, wherein the nozzle is positioned in the middle and bottom of the granulation chamber yet above the inflow base wherein the aqueous solution of L-threonine is sprayed in an upward direction.

10. The process according to claim 1, wherein the superheated aqueous solution or suspension is sprayed through the nozzle using a feed-line that is under 1 to 5 bars of pressure.

11. The process according to claim 10, wherein the nozzle is a two component pressure nozzle operated with compressed air that further comprises an extended liquid insert with a triple-groove whirling body wherein a drop of up to 5 bars of pressure is achieved when the superheated aqueous solution or suspension of L-threonine is sprayed through the two component pressure nozzle.

12. The process according to claim 1, wherein mechanical energy is introduced in the fluidized bed in order to achieve uniform granulated particles and an increase in bulk density in the granulated particles.

13. The process according to claim 12, wherein the mechanical energy is introduced into the fluidized bed by a movable flat structure.

14. The process according to claim 13, wherein the movable flat structure is selected from the group consisting of rotating knives, vanes, blade surfaces, flat iron bars or compacters.

15. The process according to claim 1, wherein the L-threonine has a purity of 80-99.5%.

16. The process according to claim 1, wherein step (e) comprises removing granulated particles within the size range of 300 μm to 800 μm from the granulation chamber at a rate such that the amount of solid L-threonine remains constant in the granulation chamber.

17. The process according to claim 1, wherein step (e) comprises removing granulated particles within the size range of 500 μm to 1,200 μm from the granulation chamber at a rate such that the amount of solid L-threonine remains constant in the granulation chamber.

* * * * *